US005704253A

United States Patent [19]
Book et al.

[11] Patent Number: 5,704,253
[45] Date of Patent: Jan. 6, 1998

[54] TRAJECTORY GUIDANCE APPARATUS AND METHOD

[75] Inventors: Wayne John Book, Atlanta; Robert Andrew Charles, Chamblee, both of Ga.

[73] Assignee: Georgia Tech Research Corporation, Atlanta, Ga.

[21] Appl. No.: 401,742

[22] Filed: Mar. 9, 1995

[51] Int. Cl.[6] .................... B25J 13/08; B25J 19/02; B25J 17/00

[52] U.S. Cl. .................... 74/490.01; 414/917; 901/9

[58] Field of Search .................... 74/490.01; 414/917; 901/9, 10

[56] References Cited

U.S. PATENT DOCUMENTS

| | | | |
|---|---|---|---|
| 4,235,437 | 11/1980 | Ruis et al. | 272/134 |
| 4,753,128 | 6/1988 | Bartlett et al. | 74/469 |
| 4,776,230 | 10/1988 | Susnjara | 414/917 X |
| 4,928,047 | 5/1990 | Arai et al. | 318/568 |
| 5,038,243 | 8/1991 | Gordon | 341/2 |
| 5,078,140 | 1/1992 | Kwoh | 128/653 |
| 5,221,283 | 6/1993 | Chang | 606/130 |
| 5,236,432 | 8/1993 | Matsen, III et al. | 606/88 |
| 5,257,998 | 11/1993 | Ota et al. | 606/130 |
| 5,279,309 | 1/1994 | Taylor et al. | 128/782 |
| 5,299,288 | 3/1994 | Glassman et al. | 395/80 |

OTHER PUBLICATIONS

Robert A. Charles, "Development of the Passive Trajectory Enhancing Robot", (Jun., 1994), (unpublished M. Mechanical Eng. thesis, Georgia Institute of Technology).

Goswami, A. et al., "Passive Robotics: An Exploration of Mechanical Computation," pp. 279–284.

Goswami, A. et al., "Mechanical Computation for Passive Force Control," 1993 IEEE Robotics & Automation, pp. 476–483.

Laurin–Kovitz, K. et al., "Design of Components for Programmable Passive Impedance," Proceedings of the 1991 IEEE Int'l. Conference on Robotics & Automation, Sacramento, CA, Apr. 1991, pp. 1476–1481.

Primary Examiner—Allan D. Herrmann
Attorney, Agent, or Firm—Thomas, Kayden, Horstemeyer & Risley

[57] ABSTRACT

A trajectory guidance apparatus can guide motion with passive actuators with at least two degrees of freedom. The trajectory guidance apparatus has a linkage that is mounted to a reference and an interaction part that is to be manipulated by a master, such as a human, gravity g, water flow, a spring, or other force generator. The linkage has at least two force elements adapted to move the interaction part so that the interaction part is guided and can be moved along a prescribed path at a prescribed velocity relative to the reference. A controllable passive coupling connects the force elements and is adapted to impart passive forces against each force element of the linkage. The passive forces are derived substantially solely from a quantity of energy that is imparted to the interaction part by the master, not from other sources. A control mechanism controls the passive coupling, dynamically if desired, so that the interaction part is moved along a prescribed path of travel at a prescribed velocity by the force elements. The control mechanism essentially shifts energy from one force element to another force element during movement of the linkage so that the prescribed path and velocity are maintained.

20 Claims, 11 Drawing Sheets

TRAJECTORY GUIDANCE APPARATUS AND METHOD

FIELD OF THE INVENTION

The present invention relates generally to the field of robotics, and more particularly, to a trajectory guidance apparatus and method for guiding motion of a master, for example but not limited to, a human, gravity g, a machine, water flow, a spring, or any other force generator, with substantially passive elements and with at least two degrees of freedom.

BACKGROUND OF THE INVENTION

Devices that permit interaction between humans and robotic devices are referred to as "haptic interfaces." Although the present invention is not limited to haptic interfaces, the focus of research that resulted in the invention was directed to this topic, and accordingly, a discussion of the background in terms of haptic interfaces is set forth hereafter. Haptic interfaces are used in many applications including robotic surgical devices, teleoperation masters, robotic exercise machines, human extenders, and others. In each case, the mechanical device and the human apply some force to each other and in some cases may actually move together with some desired velocity at the point(s) of contact, or at the interaction part(s). A robotic surgical device may be utilized to remove tissue from a patient or simply immobilize a patient. Teleoperation masters and exercise machines may be utilized to provide specific velocity and resistive forces to a human user. Extenders can be utilized to amplify the strength of a human by sensing the desired motion and adding power to perform desired tasks.

The unfortunate danger in each of the foregoing haptic interfaces is injury to humans, to the human user, or to the human subject operated upon by the haptic interface. Because many robots are capable of providing fairly high tip forces at high speeds, malfunctions can potentially lead to sudden motions in inappropriate and dangerous directions. Furthermore, another disadvantage of the prior art haptic interfaces is that they can consume much energy, thereby resulting in high cost for operation thereof.

One way to enhance safety in these interfaces is to implement numerous safety features in the haptic interfaces. The safety features can include, for example, speed governors, microprocessor watch dogs, and other automatic cutoffs. However, these features can and do fail, and further, result in unnecessary expense.

A more direct approach to eliminating these safety problems is to remove the source of undesirable motion, i.e., the "active" actuators. Active actuators are actuators that receive energy from a source other than the master that operates the interface. In contrast, "passive" actuators are actuators that operate using substantially only energy imparted by the master that operates the interface. Active devices that can supply mechanical power can also supply unwanted mechanical power, if they are given erroneous inputs. Replacing these active elements with passive elements in the interface removes the possibility of unwanted mechanical power inputs.

As an example, mechanisms are known for guiding a master along a fixed prescribed path by implementing fixed mechanical connections. For instance, one known mechanism has a linkage constructed from rigid arms, pivotal joints, and perhaps guide members for guiding the movement of the arms and/or rotation of the joints. However, a disadvantage of this technique is that it significantly compromises the ability to control the motion of the interface. Particularly, the path as well as the velocity of motion cannot be easily changed in that the mechanical connections are fixed.

SUMMARY OF THE INVENTION

An object of the present invention is to overcome the deficiencies and inadequacies of the prior art as noted above and as generally known in the industry.

Another object of the present invention is to provide a trajectory guidance apparatus and method for allowing precise trajectory guidance of motion induced by a master, including but not limited to, a human, gravity g, a machine, water flow, a spring, or any other force generator.

Another object of the present invention is to provide a trajectory guidance apparatus and method for allowing trajectory guidance in at least two degrees of freedom.

Another object of the present invention is to provide a trajectory guidance apparatus and method for safely providing trajectory guidance.

Another object of the present invention is to provide a trajectory guidance apparatus that has essentially entirely passive actuators so that substantially all of the power to operate the guidance apparatus is derived from movement of the interaction part.

Another object of the present invention is to provide a trajectory guidance apparatus that has essentially entirely passive actuators so that the apparatus is inexpensive to operate.

Another object of the present invention is to provide a trajectory guidance apparatus that utilizes braking resistance in certain manipulator joints to make motion in specific directions easier than others.

Another object of the present invention is to provide a trajectory guidance apparatus that is simple in design, easy to manufacture, and reliable in operation.

Briefly described, the present invention is a trajectory guidance apparatus and method for guiding motion in at least two degrees of freedom with passive actuators. The trajectory guidance apparatus has a linkage that is mounted to a reference position and an interaction part that is to be manipulated by a master, for example, a human, the earth's gravity g, water flow, a spring, or other force generator. The linkage has at least two force elements (rigid arms, flexible cables, etc.; each force element corresponding to a degree of freedom) adapted to move so that the interaction part is guided and can be moved along a prescribed path at a prescribed velocity relative to the reference. A controllable passive coupling is adapted to impart passive forces (i.e., forces applied by passive actuators) against the interconnected force elements of the linkage. A control mechanism controls, dynamically if necessary, the passive coupling so that the interaction part is guided along a prescribed path of travel by the force elements. The control mechanism essentially shifts energy from one force element to the other force element, when necessary, during movement of the linkage. Furthermore, the total energy utilized by the guidance apparatus to operate, minus incidental energy loss (e.g., due to friction), is generally equal to that which is provided by the master upon the interaction part.

In addition to achieving all of the aforementioned objects, the present invention has numerous other advantages, a few of which are delineated hereafter.

At least one advantage of the present invention is that the trajectory guidance apparatus can be programmed prior to operation to follow a path of travel at a desired velocity.

Another advantage of the present invention is that the trajectory guidance apparatus can be controlled dynamically during operation by feedback from an interaction part position sensor.

Another advantage of the present invention is that the trajectory guidance apparatus can learn to follow a path of travel, prior to a desired run, by moving the interaction part along a trial run so that the interaction part position sensor analyzes the path and so that the control mechanism records the path information for future operation.

Another advantage of the present invention is that the trajectory guidance apparatus can be used in a variety of applications, including but not limited to, medicine, exercise, and virtual reality. As an example, in the medical field, the trajectory guidance apparatus could be utilized to help a doctor position a probe within a patient. In this approach, the probe would be secured near the interaction part, and the interaction part would be directly moved by the doctor. The implementation of the trajectory guidance apparatus in this manner would result in minimal invasive surgery because the path of travel of the probe can be determined ahead of time by a suitable imaging system (e.g., magnetic resonance imaging (MRI)). As another example, in the field of virtual reality, the trajectory guidance apparatus could be utilized to provide the sensation of a rigid object or surface by inhibiting motion in a particular direction. Particularly, the virtual reality user can contact the surface of an imaginary "table" utilizing the trajectory guidance apparatus described herein by attaching, or otherwise affixing, the user's hand to the interaction part.

Another advantage of the present invention is that the trajectory guidance apparatus can be operated in connection with applications other than haptic interfacing. In other words, the master that moves the interaction part need not necessarily be a human, but instead could be an animal, machine, gravity g, water flow, a spring, or any other thing for imparting force to cause motion.

Another advantage of the present invention is that the trajectory guidance apparatus can be implemented with a variety of passive actuators, including but not limited to, friction-based brakes, passive hydraulic cylinders, passive pneumatic cylinders, etc.

Another advantage of the present invention is that the trajectory guidance apparatus provides for instantaneous stoppage of the interaction part when the master ceases to provide an interaction force.

Another advantage of the present invention is that the trajectory guidance apparatus can exhibit more than two degrees of freedom, for example but not limited to, three to six degrees of freedom.

Other objects, features, and advantage of the present invention will become apparent to one of skill in the art upon examination of the following drawings and detailed description. It is intended that all such additional objects, features, and advantages be incorporated herein.

BRIEF DESCRIPTION OF THE DRAWINGS

The present invention can be better understood with reference to the following drawings. The drawings are not necessarily to scale, emphasis instead being placed upon clearly illustrating principles of the present invention. Furthermore, in the drawings, like reference numerals designate corresponding parts throughout the several views.

FIGS. 1A and 1B show a first embodiment of a trajectory guidance apparatus in accordance with the present invention; particularly, FIG. 1A shows a plan view, and FIG. 1B shows a cross sectional view of a spool valve of a hydraulic coupling of FIG. 1A;

FIGS. 3A and 3B show a second embodiment of the novel trajectory guidance apparatus; specifically, FIG. 3A shows a plan view, and FIG. 3B shows a detailed view of the differential/braking mechanism of FIG. 3A;

FIGS. 5A and 5B show a fourth embodiment of the novel trajectory guidance apparatus; specifically, FIG. 5A shows a plan view, and FIG. 5B shows an enlarged cut-away view;

FIGS. 6A-6C show a fifth embodiment of the novel trajectory guidance apparatus; specifically, FIG. 6A shows a perspective view, FIG. 6B shows a side view of the linkage of FIG. 6A, and FIG. 6C shows the coupling for manipulating the linkage of FIG. 6B;

DETAILED DESCRIPTION OF THE PREFERRED EMBODIMENTS

The trajectory guidance apparatus and associated methodology of the present invention utilizes passive actuators to implement trajectory control of an interaction part. "Trajectory control" in the context of this document means control of the direction and velocity of the interaction point. Moreover, passive systems have essentially no power input devices. In other words, generally all of the power required to move the trajectory guidance apparatus is supplied by a master of some sort, such as a human, gravity g, machine, water flow, a spring, or some other force generator. The master inputs an unpredictable combination of force and velocity to the trajectory guidance apparatus, and the passive actuator(s) endeavor to redirect the supply of motion in the desired direction and with the desired velocity, because it cannot add any energy to the system.

A successful trajectory guidance apparatus should be able to redirect a wide range of supplied force into the desired motion. The passivity implies that the device cannot supply any energy to its own motion. Hence, if the total energy of the system at the initial condition is not substantially equal to the total energy of the system at the desired final condition, plus the energy input by the user during the time period of concern, then the final condition is not reachable. Simply put:

$$KE_f + P_f = KE_i + P_i + U_{in}$$

where KE represents kinetic energy, P represents potential energy relative to some reference, and $U_{in}$ represents the energy input by the user. This assumes that all of the energy of the system can be redirected perfectly without loss. Once losses are subtracted, the total energy available for motion is reduced even further.

First Embodiment

Figure 1A:
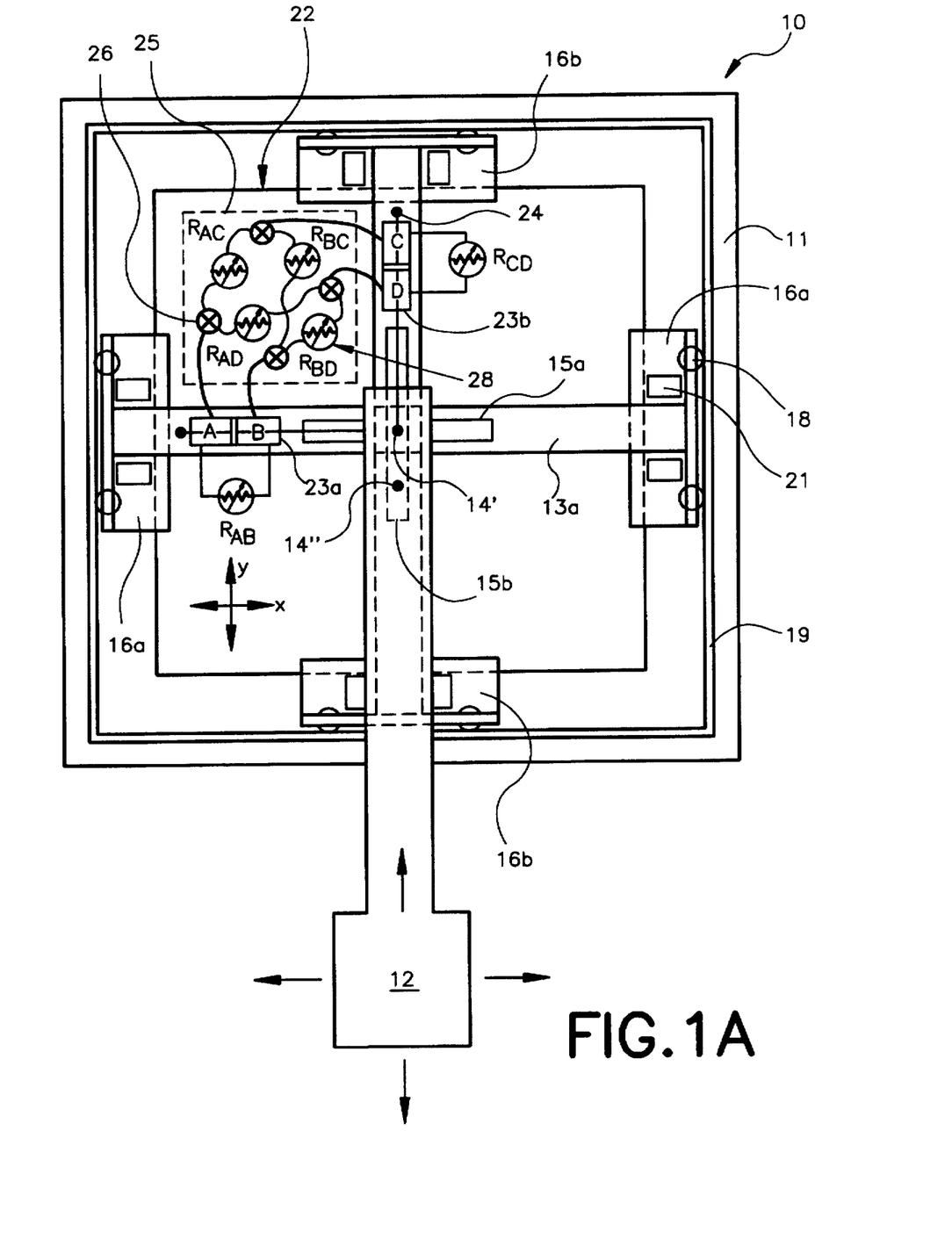
Figure 1B:
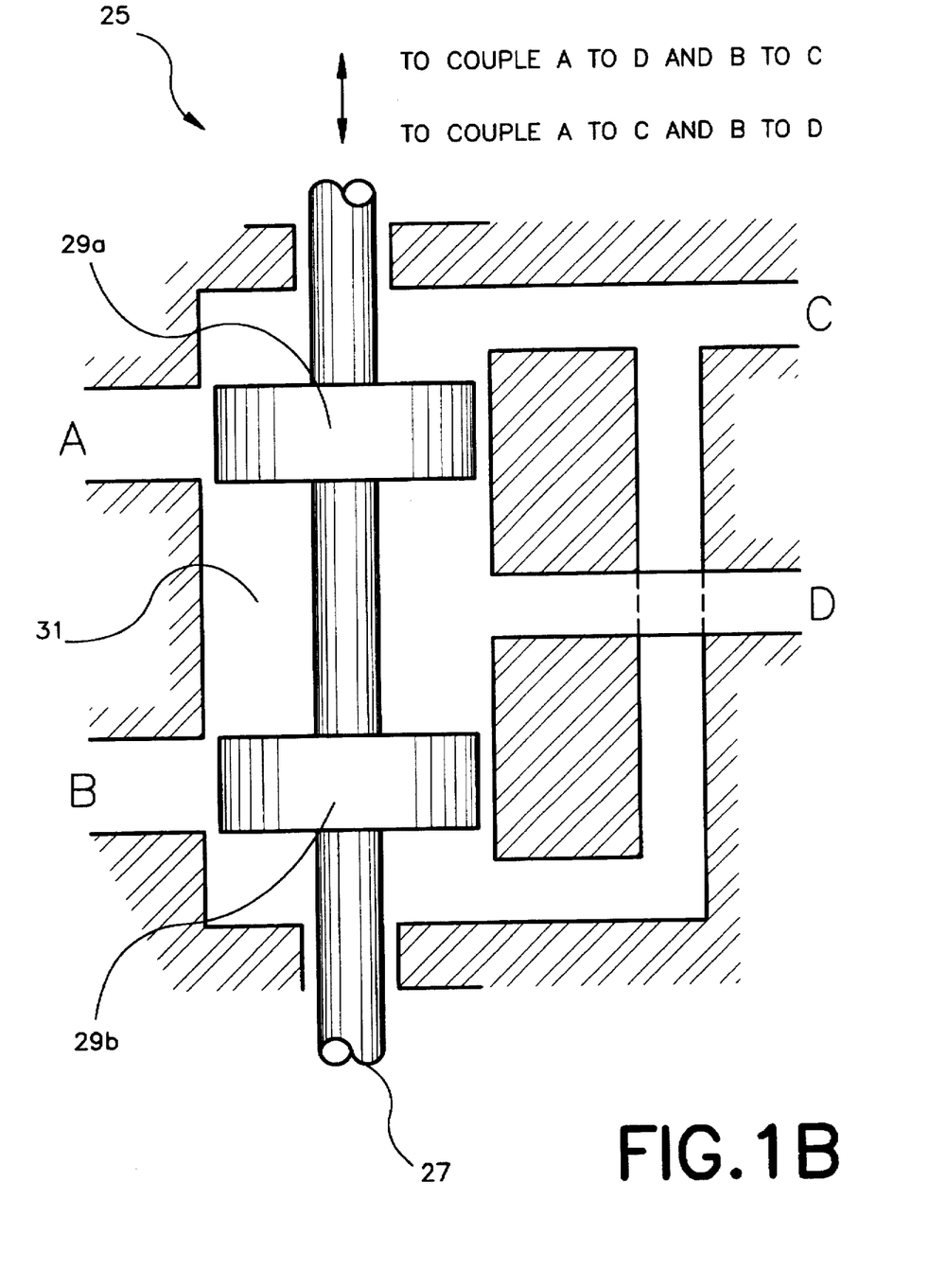

With reference now to the drawings, FIGS. 1A and 1B show a first embodiment of the trajectory guidance apparatus, and this first embodiment is generally denoted by reference numeral 10. The trajectory guidance apparatus 10 has a rigid, square-shaped table frame 11 within which a linkage is moved via an interaction part 12. The table frame 11 serves as the reference of the apparatus 10. The linkage comprises a first elongated member 13a and a second elongated member 13b. The first and second elongated members 13a, 13b are effectively interconnected by a pin 14', or a post, that is mounted to the interaction part 12 and extends down into and slides in elongated rectangular open slots 15a, 15b within respective members 13a, 13b. The slots 15a, 15b essentially impart two degrees of motion freedom to the pin 14'. The interaction part 12 has another pin 14" that extends down into and slides within slot 15b. The pin 14" is provided for the purpose of restraining rotation of interaction part 12.

The elongated members 13a, 13b are guided by carriages 16a, 16b or some other suitable linear bearing. Carriages 16a are situated at the distal ends of the member 13a. Further, carriage 16b that guides the member 13b is situated at a distal end thereof and the other carriage 16b is situated near the interaction part 12. Each carriage 16 has a pair of wheels 18 for permitting the carriage 16 to ride upon an inner rail 19 of the table frame 11. Moreover, each carriage 16 has confinement posts 21 situated on both sides of each respective member 13 (a & b) for guiding the respective member 13 (a & b) and permitting slight angular pivoting of the respective member 13 (a & b).

Thus, it is apparent from the structure in FIG. 1A and the previous discussion that the interaction part 12 can be moved in any direction within the plane of the table frame 11, as indicated by multi-direction reference arrows in FIG. 1A, and that movement of the interaction part 12 causes the elongated members 13a, 13b to move the carriages 16 along the rail 19 of the table frame 11.

A controllable passive coupling 22 is connected to each of the elongated members 13a, 13b for imparting passive forces against movement of the elongated members 13a, 13b, so as to thereby guide movement of the interaction part 12 along a prescribed path of travel. The controllable passive coupling 22 can take various configurations, including but not limited to, mechanical, electrical, hydraulic, pneumatic, or a combination thereof. In the first embodiment, the preferred implementation is hydraulic. Specifically, the coupling 22 comprises a linear hydraulic cylinder 23 situated on each elongated member 13 (a & b) for imposing a force between a fixed location 24 along the member 13 (a & b) and the pin 14'. Each cylinder 23 has a moveable internal piston and a piston rod attached thereto for imposing the aforementioned force. The respective hydraulic cylinders 23a, 23b are interconnected via a hydraulic network having a plurality of branch spitters 26 (h) for interfacing multiple hydraulic fluid paths and a plurality of flow regulators 28 for regulating the flow of hydraulic fluid, as are illustrated in FIG. 1A. In the preferred embodiment, the flow regulators 28 are flow restrictors adapted to restrict or completely stop the flow rate through the fluid paths.

The flow regulators 28 are controlled electrically as illustrated in FIG. 1A via variable fluid resistances $R_{AB}$, $R_{AC}$, $R_{AD}$, $R_{BC}$, $R_{BD}$, $R_{CD}$. With respect to notation, $R_{XY}$ corresponds to the resistance occasioned by fluid flow through a flow regulator 26 (with adjacent notation $R_{XY}$) connecting cylinder chambers x and y.

In operation, the hydraulic cylinders 23 (a & b) have hydraulic fluid on both sides (A,B for cylinder 23a and C,D for cylinder 23b) of their internal pistons, and each side of each cylinder 23 is connected to both sides of the other cylinder 23 as well as to the other side of itself. The flow regulators 28 control these connections by opening specific fluid paths at particular times. In addition, a fluid reservoir (not shown for simplicity) can supply extra fluid to each side of both cylinders.

The foregoing configuration makes it possible to channel the fluid being pushed out of one cylinder 23 to one side of the other cylinder 23, thereby causing a desired motion in the second cylinder 23. In terms of an x-y coordinate system and the plane of the table frame 11, if the x velocity of the system is in the right direction, but the y velocity is not quite large enough, feeding the y cylinder 23b extra fluid could help increase the y velocity. This would change the angle of the velocity with respect to one of the axes. This is especially helpful when the velocity is directed along one of the axes because a component of velocity can be added perpendicular to that axis very easily.

FIG. 1B shows a preferred embodiment for implementing the branch splitters 26 and the flow regulators 28 associated with $R_{AC}$, $R_{AD}$, $R_{BC}$, $R_{BD}$ of FIG. 1A. The preferred embodiment is a 4-way spool valve 25 having a cylindrical shaft 27 with a pair of spaced circular disks 29. The shaft 27 as well as the disks 29 can be moved in either direction axially, for example, by a solenoid coil (not shown), within chamber 31 to thereby concurrently adjust $R_{AC}$, $R_{AD}$, $R_{BC}$, $R_{BD}$. The 4-way spool valve 25 of FIG. 1B is simple in construction, small in size, and inexpensive to produce, thereby making it a desirable implementation.

Figure 2:
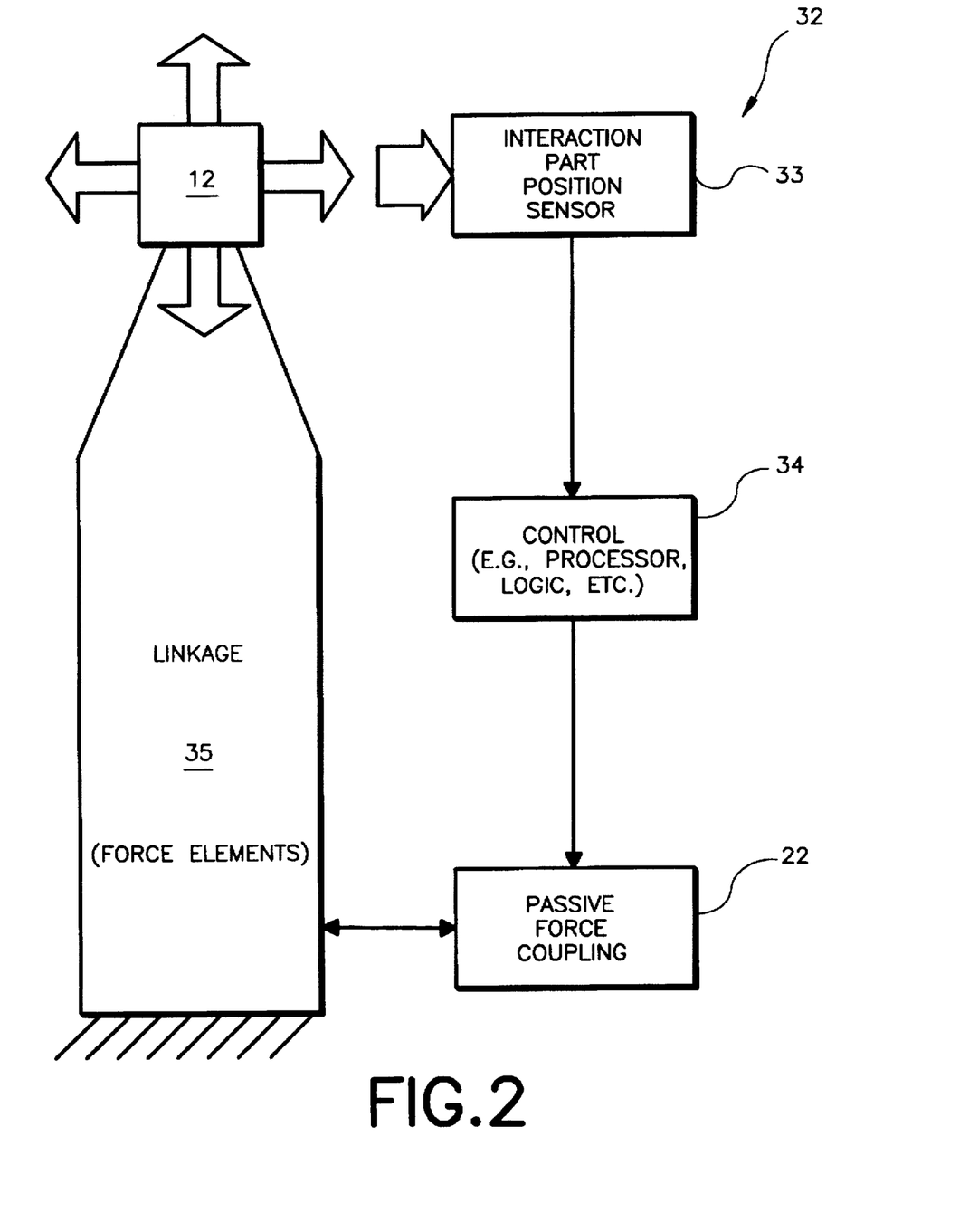
FIG. 2 shows a block diagram of an electronic control system for the various embodiments of the novel trajectory guidance apparatus.

FIG. 2 shows a high level block diagram of an electrical control system 32 for controlling the trajectory guidance apparatus 10 of FIG. 1A as well as the other trajectory guidance apparatuses 40 (second embodiment of FIGS. 3A and 3B), 60 (third embodiment of FIG. 4), 90 (fourth embodiment of FIGS. 5A and 5B), 130 (fifth embodiment of FIGS. 6A–6C) to be described hereinafter. The discussion hereafter is applicable to all of the aforementioned embodiments.

An interaction part position sensor 33 is positioned somewhere on the apparatus 10 in order to sense the position of the interaction part 12 at any instance in time, and the monitoring may be substantially continuous, if desired. The interaction part position sensor 33 can be any conventional or suitable mechanism for detecting the current position of the interaction part 12. Examples of apparatuses that could be employed in the interaction part position sensor 33 include any of the following well known mechanisms (not shown): encoders or potentiometers for measuring shaft angles; optical imaging using, for instance, a camera, in relation to a reference; implementation of linear variable differential transformers (LVDT); and implementation of an optical sensor, such as a laser inferometer, to determine the position of the interaction part 12 relative to a reference.

As further shown in FIG. 2, the interaction part position sensor 33 provides position signals to a control mechanism 34, for example but not limited to, a software-driven processor or logic array. Furthermore, the control mechanism 34 provides control signals, dynamically if desired, to the controllable passive coupling 22, based upon the present location of the interaction part 12 and the desired path of travel of the interaction part 12. As mentioned, the controllable passive coupling 22 can be, for example, mechanical, electrical, pneumatic, hydraulic, or a combination thereof.

As indicated by the bidirectional arrow in FIG. 2, the passive force coupling 22 receives energy from and applies energy to a linkage 35 that is connected to the interaction part 12 for guiding movement of the interaction part 12 in at least two degrees of freedom (DOF). The linkage 35 is comprised of a plurality of force elements (e.g., arms 13a, 13b in FIG. 1), and energy can be transferred from one to the other, if necessary or desirable, by the passive force coupling 22.

With the electrical control system 32, the trajectory guidance apparatus 10 can be programmed prior to operation to follow a path of travel at a desired velocity. As an example, in the medical field, the trajectory guidance apparatus 10 could be utilized to help a doctor position a probe within a patient. In this approach, the probe would be secured near the interaction part 12, and the interaction part 12 would be directly moved by the hand(s) of the doctor. The implementation of the trajectory guidance apparatus 10 in this manner would result in minimal invasive surgery because the path of travel of the probe can be determined ahead of time by a suitable imaging system (e.g., magnetic resonance imaging (MRI)).

Another advantage of the control system 32 is that the trajectory guidance apparatus 10 can be controlled dynamically during operation by feedback from the interaction part position sensor 33.

Finally, with the control system 32, the trajectory guidance apparatus 10 can "learn" to follow a path of travel, prior to a desired run, by moving the interaction part 12 along a trial run so that the interaction part position sensor 33 analyzes the path and so that the control mechanism 34 records the path information for future operation.

Second Embodiment

Figure 3A:
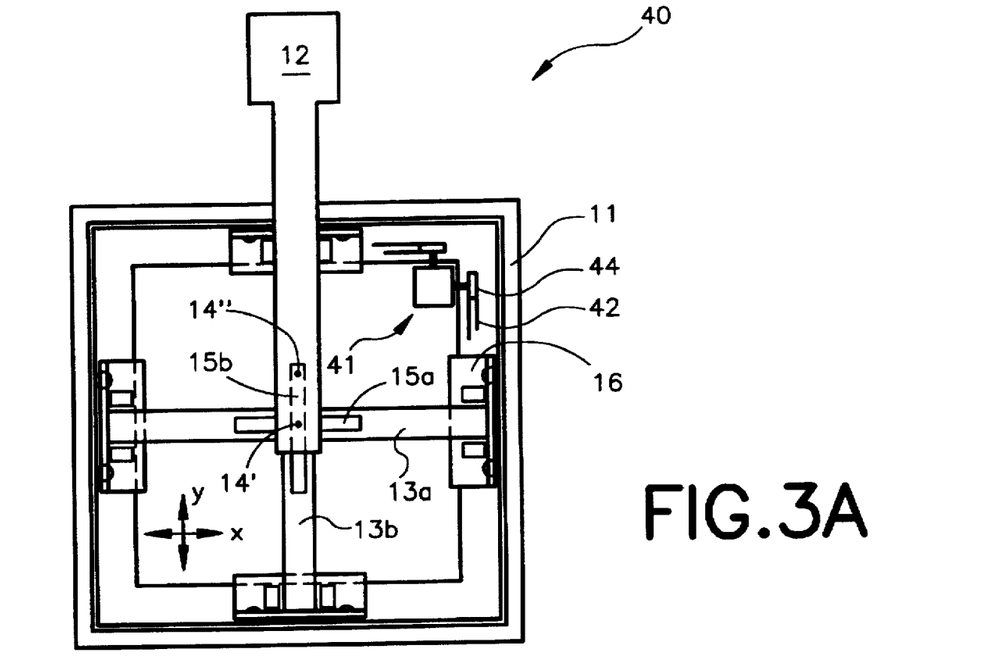
Figure 3B:
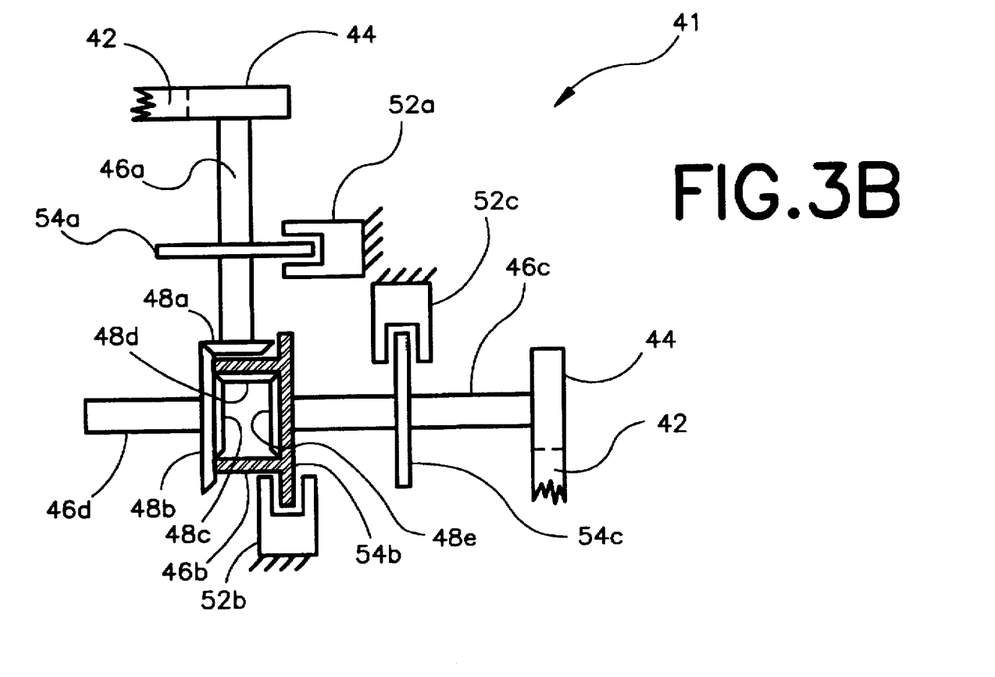

FIGS. 3A and 3B illustrate a second embodiment of the novel trajectory guidance apparatus in accordance with the present invention, and the second embodiment is generally denoted by reference numeral 40. The trajectory guidance apparatus 40 is similar in structure to the trajectory guidance apparatus 10, but instead of employing a hydraulic passive coupling 22 as in the apparatus 10, the trajectory guidance apparatus 40 employs a differential/braking mechanism 41, which is best illustrated in FIG. 3B.

As shown in FIG. 3A, belts 42 connect the differential/braking mechanism 41 to a carriage 16 secured to each elongated member 13a, 13b. The belts change linear motion into revolute motion. The differential/braking mechanism 41, which is similar to that in a rear-drive automobile, has pulleys 44 for driving the belts 42. In essence, the differential/braking mechanism 41 permits coupling between the members 13a, 13b moving along the x-axis and y-axis, respectively.

As shown in FIG. 3B, the differential/braking mechanism 41 has three rotatable members 46a-46c that are interfaced via a series of gear-teeth-bearing bevel gears. The bevel gears include a bevel gear 48a connected to the shaft 46a and engaged with a bevel gear 48b that is connected to a supporting shaft 46d. A bevel gear 48c is also connected to the shaft 46d and is engaged with a bevel gear 48d, which rotates about an axis fixed in the rotating cage 46b. Bevel gear 48d is also engaged with bevel gear 48e that is connected to shaft 46c that protrudes through an appropriately mounted bearing in cage 46b. Furthermore, brakes 52a-52c can impede rotation of rotatable members 46a-46c, respectively, via respective disks 54a-54c. As is apparent from FIG. 3B, the differential/braking mechanism 41 allows shafts 46a, 46c to rotate substantially independently until brake 52b impedes the rotation of cage 46b, whereupon torque will be transmitted between shaft 46a and shaft 46c.

If braking action of 52b occurs to the extent that cage 46b ceases to rotate, the shaft 46a and the shaft 46c will rotate at the same speed. If instead, braking of bevel gear 48d were enabled (through a braking device not shown for simplicity) and activated and bevel gear 48d ceased to rotate with respect to cage 46b, then shafts 46a, 46c would rotate with the same speed but in directions opposite than that resulting from braking with the brake 52b. Braking action on members 46a, 46b, 46c and bevel gear 48d by appropriately controlled amounts will enable substantial positional control over the pulleys 44 and consequently the interaction part 12.

Third Embodiment

Figure 4:
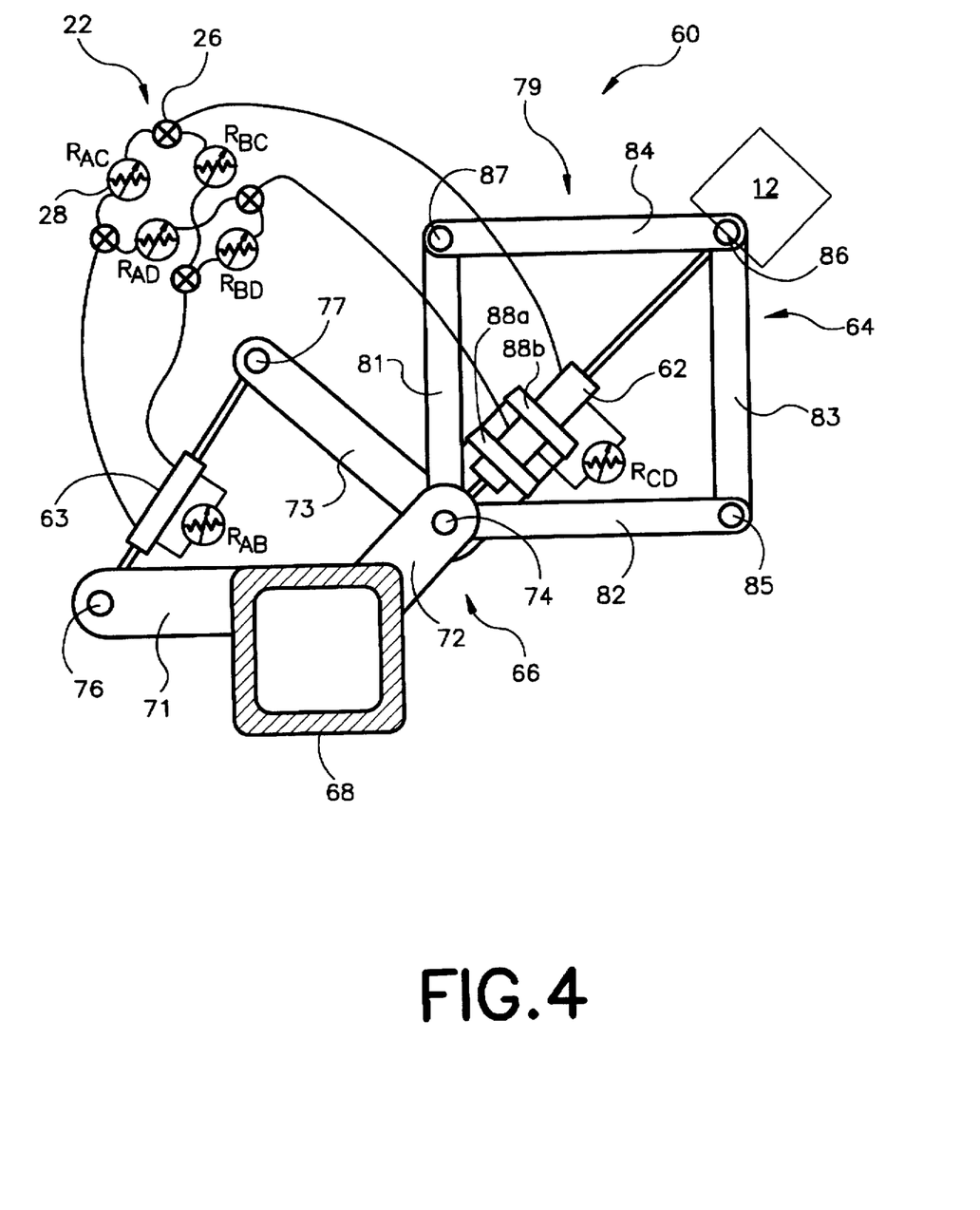
FIG. 4 shows a third embodiment of the novel trajectory guidance apparatus.

FIG. 4 shows a third embodiment of the novel trajectory guidance apparatus and is generally denoted by reference numeral 60. The trajectory guidance apparatus 60 is structured differently than the trajectory guidance apparatus 10 (FIG. 1A), but employs a similar hydraulic passive coupling 22 having hydraulic cylinders 62, 63 for implementing one prismatic joint 64 and one revolute joint 66, respectively. Specifically, in structure, the trajectory guidance apparatus 60 comprises a square-cross-sectional base beam 68, serving as a reference, having two protruding support members 71, 72. An L-shaped pivotal member 73 pivots about the member 72 via pin 74 at revolute joint 66. Moreover, the hydraulic cylinder 63 is connected to and between support members 71, 73 via respective pins 76, 77.

As further shown in FIG. 4, a four-arm parallelogram assembly 79 comprising arms 81-84 interconnected by pins 74, 85, 86, 87 pivots about the pin 74 of joint 66 in relation to the base beam 68. Moreover, the hydraulic cylinder 62 is connected between the pins 74 and 86 and is also connected to the L-shaped pivotal member 73 with brackets 88a, 88b, as shown. Thus, the foregoing pivoting action of the parallelogram assembly 79 about pin 74 is controlled by extension and retraction of the cylinder 63, which causes pivoting of L-shaped pivotal member 73, of cylinder 62, and of the parallelogram assembly 79.

Based upon the structure illustrated in FIG. 4 and described previously, the cylinder 63 can manipulate the distance between members 76, 77, thereby manipulating the position of the interaction part 12 angularly about the base beam 68 to effectuate a revolute joint 66. Moreover, the cylinder 62 can manipulate the radial distance of the interaction part 12 relative to the base beam 68 by implementing a prismatic joint 64.

Fourth Embodiment

Figure 5A:
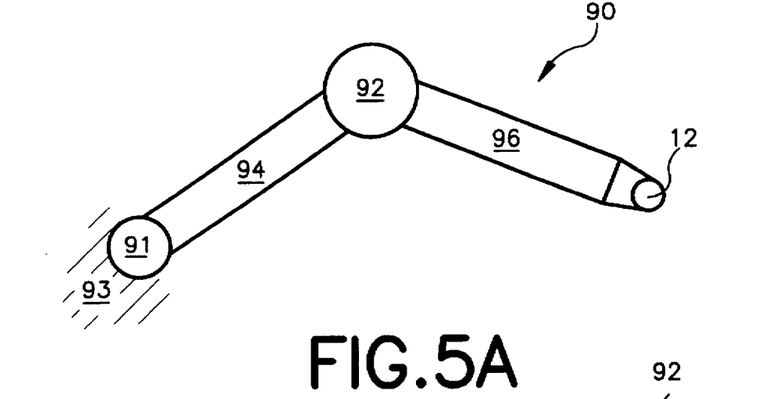
Figure 5B:
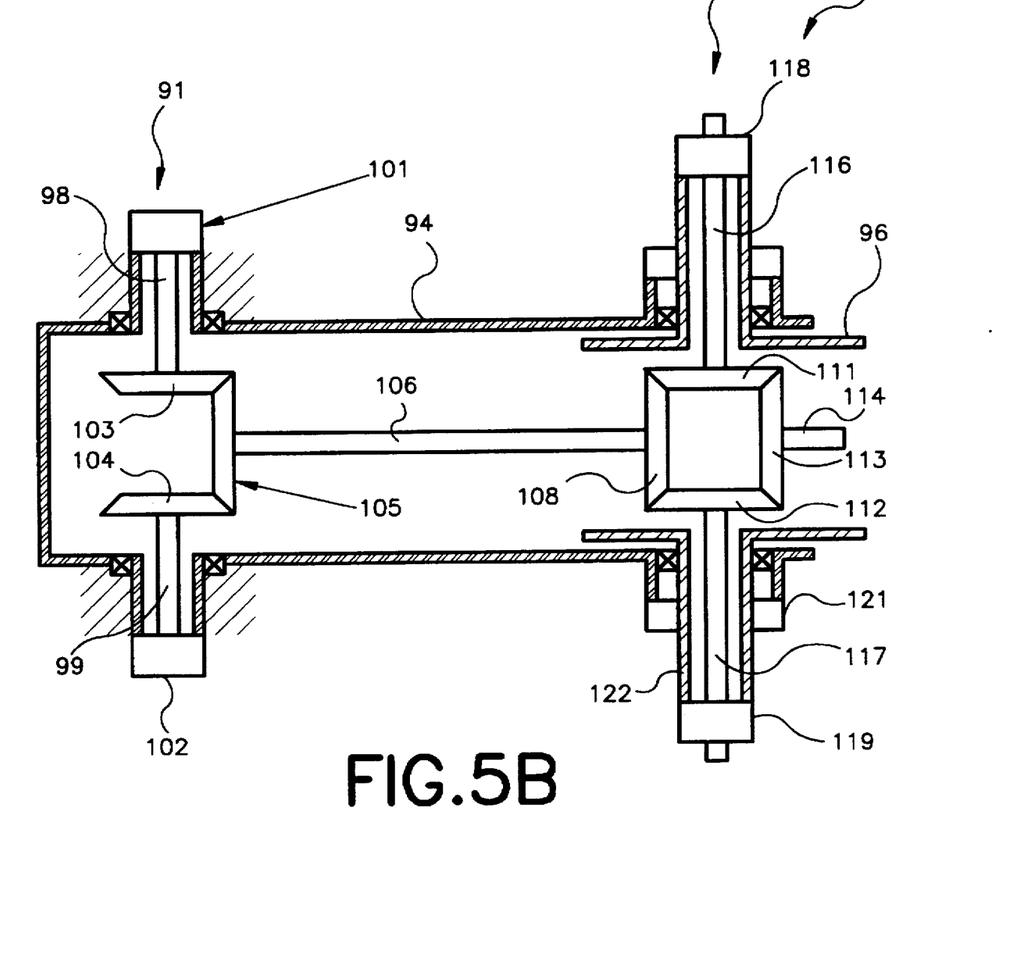

FIGS. 5A and 5B illustrate a fourth embodiment of the novel trajectory guidance apparatus, and the fourth embodiment is generally denoted by reference numeral 90. The trajectory guidance apparatus 90 has at least two degrees of freedom. The embodiment shown in FIGS. 5A and 5B has only two degrees of freedom for the sake of simplicity, but it should be understood that any number of degrees of freedom could be implemented, including for example but not limited to, any number from two to six degrees of freedom. Moreover, the trajectory guidance apparatus 90 employs two revolute joints 91, 92 as illustrated in FIG. 5A. The revolute joint 91 is connected to a reference 93 and a first arm 94, and the second revolute joint 92 connects the first arm 94 to a second arm 96. The second arm 96 has the interaction part 12.

As shown in the cross-sectional view of FIG. 5B, the apparatus 90 comprises aligned shafts 98, 99 situated substantially at the revolute joint 91. Brakes 101, 102 affect and regulate rotation of the respective rotatable joint shafts 98, 99. Bevel gears 103, 104 are connected to respective joint shafts 98, 99, and both of the foregoing bevel gears 103, 104 engage a bevel gear 105, as shown in FIG. 5B. An elongated rotatable first arm shaft 106 is connected to the bevel gear 105 and also to a bevel gear 108 situated at the revolute joint 92. Bevel gear 108 is engaged with bevel gears 111, 112, which both in turn engage bevel gear 113. Bevel gear 113 is connected to an elongated second arm shaft 114. At the revolute joint 92, bevel gears 111, 112 are connected to respective rotatable joint shafts 116, 117. Moreover, brakes 118, 119 engage and regulate the rotation of respective joint shafts 116, 117. Finally, a brake 121 regulates the pivoting of the second arm 96 about the revolute joint 92 by engaging cylindrical extension 122, which protrudes from the second arm 96.

In operation, locking one of the brakes 101, 102, on the first arm 94 causes the first arm shaft 106 to rotate axially with a specific rotation relative to arm 94 when arm 94 rotates about revolute joint 92. Locking the other brake 102, 101 instead causes the arm shaft 106 to rotate in the opposite direction. If the first arm 94 is moving in the desired direction, this capability allows for a rotation in either direction to be forced on the second arm 96 by activating either brakes 118 or 119. The second arm 96 can affect the first arm 94 in the same manner, by using the brakes at the joints 91, 92. If the brakes are allowed to slip, different speed ratios can be achieved if the device dynamics and the input force are considered. The trajectory guidance apparatus 90 can brake each of its arms 94, 96 individually and can couple its joints to allow an arm 94, 96 with the proper direction of motion to induce motion in either direction on the other arm.

In addition, the apparatus 90 could be easily expanded to additional degrees of freedom by allowing arm shaft 114 to run to an additional joint(s) (not shown) of design substantially similar to that of joint 92, thereby creating an additional arm(s). The additional arm(s) would operate in the same manner as the arm 96. The arm shafts simply act as a power source for the arms, which either supply or receive power. Of course, the complexity of control becomes more complicated as the number of arms/joints increases, but the basic principles are the same.

Fifth Embodiment

Figure 6A:
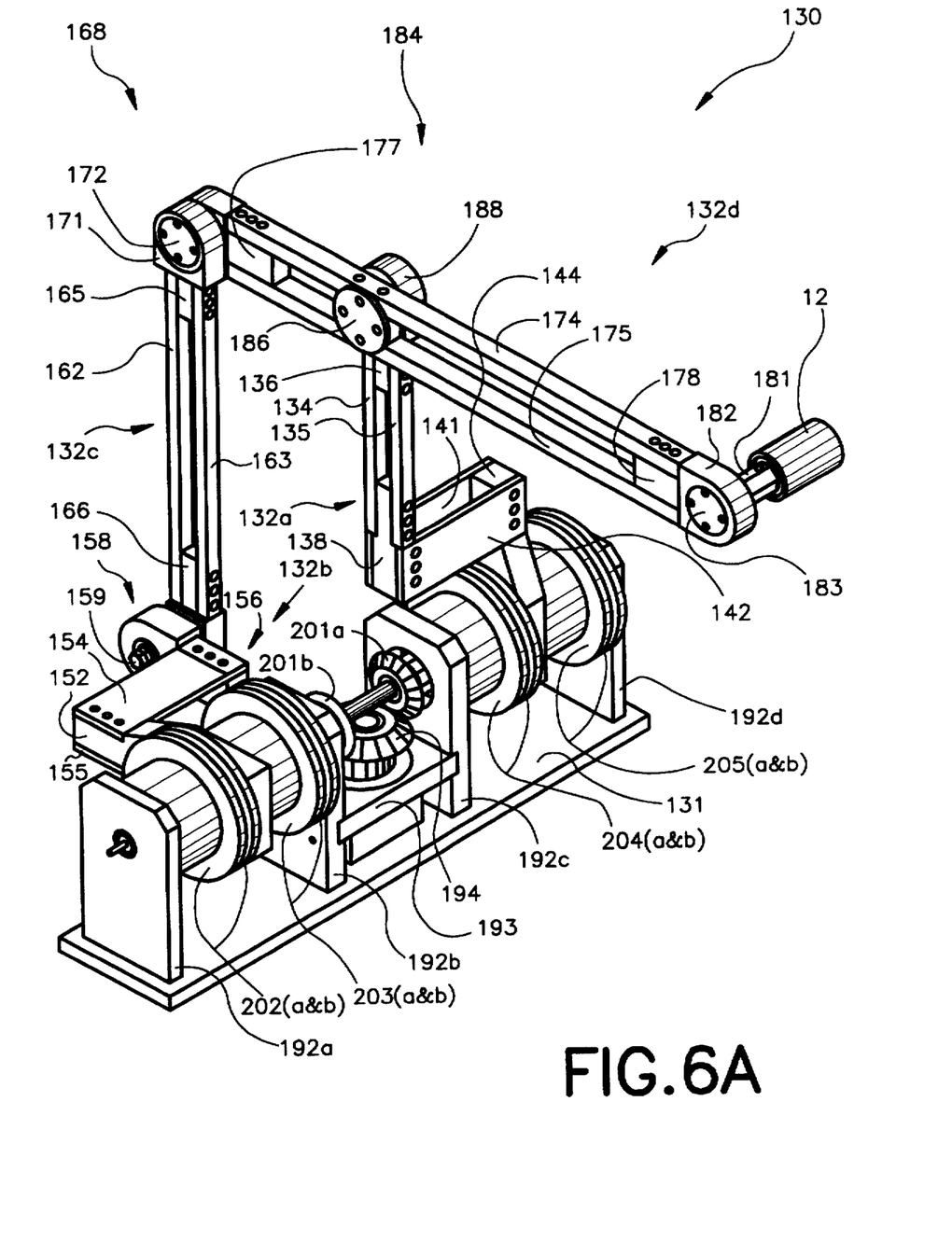
Figure 6B:
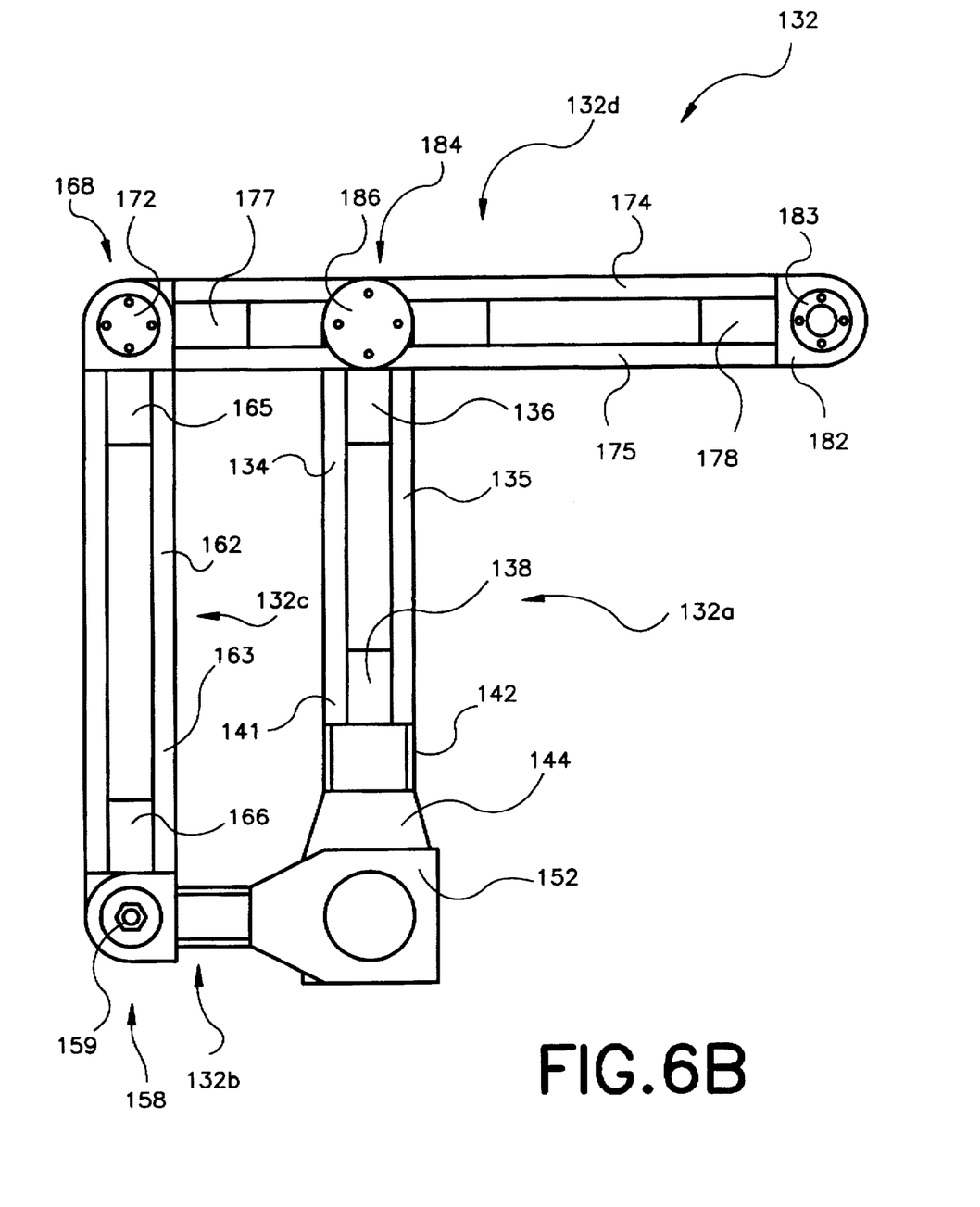
Figure 6C:
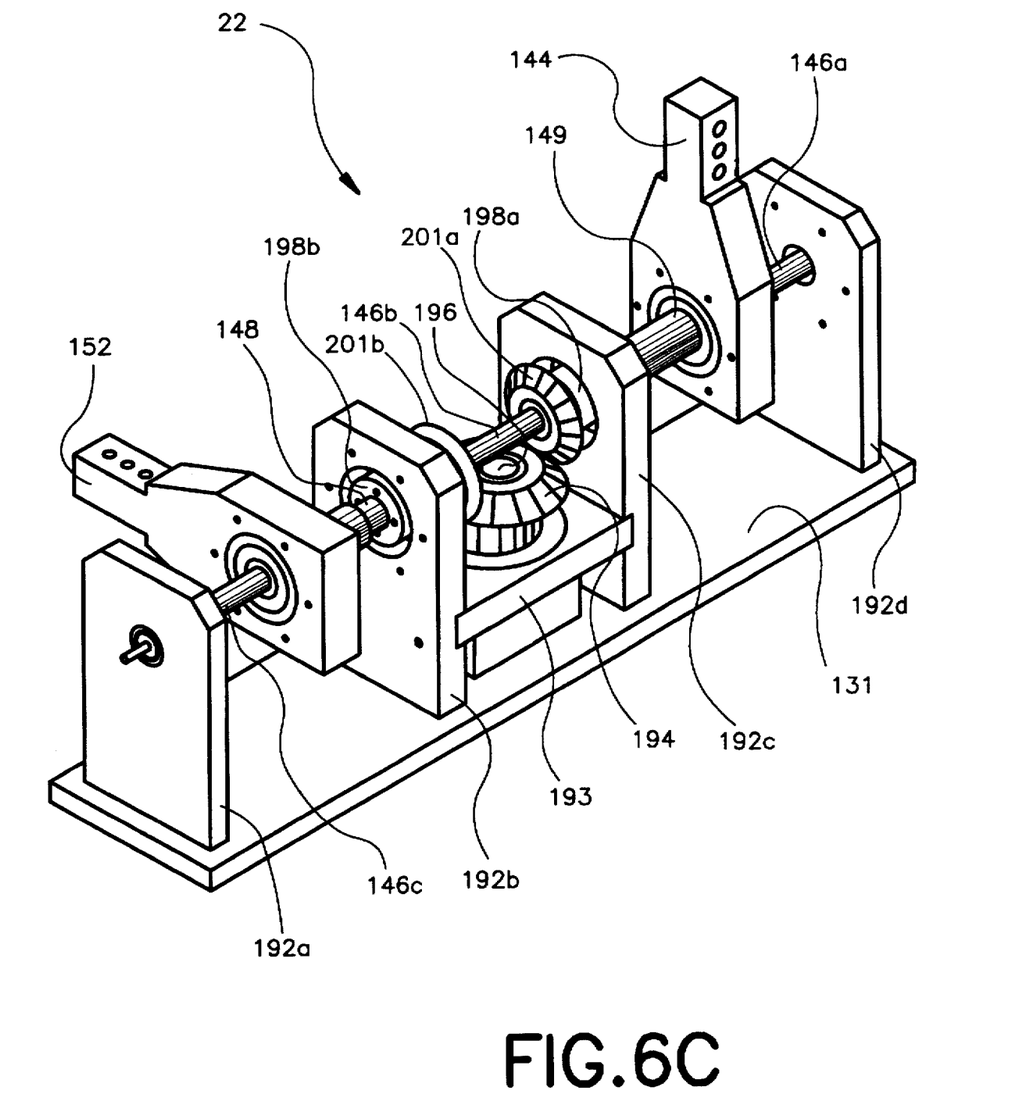

A fifth embodiment of the trajectory guidance apparatus is shown in FIGS. 6A–6C and is generally denoted by reference numeral 130. The trajectory guidance apparatus 130 generally comprises a planar reference base 131 that supports a moveable multi-arm linkage 35 (FIG. 2) having arms 132a–132d. Moreover, the multi-arm linkage 35 provides the interaction part 12 in the form of a handle, as an example. As will be further described in detail hereafter, the trajectory guidance apparatus 130 has a passive coupling 22 that utilizes brakes 202(a & b)–205(a & b) in combination with a plurality of shafts 146, 148, 149, with shafts 148, 149 being concentric to shaft 146, in order to provide both direct coupling and indirect coupling between two arms 132a, 132b that essentially guide motion of the linkage 35 and interaction part 12.

The linkage 35 has four interconnected elongated arms 132a–132d that form an adjustable parallelogram structure. As shown in FIG. 6B, the arm 132a has two square cross-sectional elongated side rails 134, 135 connected to rectangular planar end regions 136, 138. The end region 138 is connected to parallel side plates 141, 142 (FIG. 6A). The parallel side plates 141, 142 are connected to and sandwich therebetween a shaft plate 144. The shaft plate 144 is affixed to an elongated rotatable small inner shaft 146 via a conventional tapered locking bushing (not shown).

The arm 132b is affixed to the large outer shafts 148 (the other large outer shaft being denoted by reference numeral 149) via a shaft plate 152 (FIG. 6C), by way of a conventional tapered locking bushing (not shown). The shaft plate 152 is connected to two parallel rectangular side plates 154, 155 (FIG. 6A). The parallel rectangular side plates 154, 155 are in turn mounted to a planar end piece 156 that is secured to arm 132c via pivoting joint 158. The pivoting joint 158, as well as the other joints 168, 184, can be implemented with any suitable mechanism. In the preferred embodiment, the joint 158 is implemented via a conventional axle arrangement 159, which has an axle, end screws, and optionally, screw washers, bushings, and bearings.

The arm 132c has parallel square cross-sectional elongated side rails 162, 163 connected to end plates 165, 166. The end plate 166 is pivotally secured to the pivoting joint 158 so that the arm 132c pivots about the joint 158. End plate 165 has a semicircular end piece 171 pivotally connected at joint 168 to the arm 132d. The joint 168 can be any suitable pivoting mechanism, but is preferably an axle arrangement with a flange 172 secured at opposing ends via screws.

The arm 132d has parallel elongated square cross-sectional side rails 174, 175 connected to rectangular planar end regions 177, 178. The end region 177 is pivotally connected to the joint 168 as described previously with an axle arrangement. The end region 178 has a semicircular end piece 182. The semicircular end piece 182 is mounted to a square cross-sectional transverse bar 181 that provides the interaction part 12 via a flange and screw arrangement 183 that secures the bar 181 to the piece 182.

The arm 132d is pivotally connected to the arm 132a at a pivoting joint 184 (FIG. 65). The joint 184 can be any suitable pivoting mechanism, but is preferably an axle arrangement (not shown) having a circular end flange 186 secured at one end via screws and the end piece of plate 136 secured at the other end.

The coupling 22 of the arms 132a–132d is best illustrated in FIG. 6C. To support the coupling 22, four upstanding vertical support plates 192a–192d rise upwardly from and are connected to the reference base 131. Each of the upstanding support plates 192a–192d has an aperture for permitting passage of the shaft 146 or a combination of two concentric shafts. Further, a planar transverse brace plate 193 is disposed between upstanding support plates 192b, 192c in order to support a differential bevel gear 194 that is freely rotatable about a shaft 196 passing through the underlying transverse brace plate 193.

The coupling 22 has an elongated small inner shaft 146 which runs the entire length of the reference base 131 and passes through all of the upstanding support plates 192a–192d. Large outer shafts 148, 149, which are hollow to permit passage of the small inner shaft 146 therethrough, rotate concentrically about the small inner shaft 146. Both of the outer shafts 148,149 are attached to the ends of the hubs 198(a & b) of a bevel gears 201(a & b) with screws through flanges on the shafts 148, 149. The hubs 198(a & b) of each gear 203(a & b) rides on a ball bearing mounted in the upstanding support plates 192b, 192c. The flanges on the large outer shafts 148, 149 act to retain the hubs 198(a & b) in the bearing. Needle bearings pressed into the outer shafts 148, 149 ride on the inner shaft 146 allowing relative motion between the inner and outer shafts 146, 148, 149 to occur.

11

As is further shown in FIG. 6C, the arm 132a that is connected to shaft plate 144 and the arm 132b that is connected to shaft plate 152 can shift energy back and forth via the shaft 146 and the differential mechanism comprised of bevel gears 201(a & b) engaged with differential bevel gear 194.

Referring both to FIGS. 6A and 6C, brake mechanisms 202(a & b)–205(a & b), which are controlled by the control mechanism 34 (FIG. 2), regulate the rotation of the shafts 146, 148, 149 and, consequently, motion of the multi-arm linkage 35 and interaction part 12. The brake mechanisms 202(a & b)–205(a & b) are preferably conventional electromagnetic-type mechanisms, but any suitable brake mechanism could be implemented. In the electromagnetic brake mechanisms 202(a & b)–205(a & b), electric current passes through a tightly wound coil wire, creating a magnetic field as in an electromagnet. This part of the brake is called the field coil 202(a)–205(a). A friction surface is mounted to one side of the field coil. The magnetic field attracts the other friction surface, the ferrous rotor 202(b)–205(b), which is attached to a shaft. The force of attraction causes the two friction surfaces to rub together, thereby producing a torque, assuming relative velocity between the friction surfaces. Changing the voltage across the field coil and thereby the current through it, changes the attractive force between the rotor 202(b)–205(b) and the field coil 202(a)–205(a). Hence, certain voltages correspond to certain torques applied by the brake mechanisms 202(a & b)–205(a & b).

Arm 132b can be coupled to the inner shaft 146 via brake mechanism 202(a & b). The rotor 202(b) for this brake mechanism 202(a & b) rotates with the inner shaft 146, and the field coil 202(a)–205(a) rotates with the arm 132b. The inner arm 132b is braked against the plate 192b via the outer shaft 148 that is affixed to the arm 132b. Arm 132a can be coupled to the outer concentric shaft 149 via the brake mechanism 204(a & b). Again, the brake rotor 202(b) is mounted to the shaft 149, and the field coil 204(a) is mounted to the left side of the arm 132a. Further, the arm 132a is braked through the inner shaft 146 and brake mechanism 205(a & b), as the arm 132a is affixed to the inner shaft 146.

In the preferred embodiment, the maximum torque possible in each shaft 146, 148, 149 was 3600 in-lbf because this was the maximum that the brake mechanisms 202(a & b)–205(a & b) could withstand without slipping. This loading coupled with the estimated weight of the arms 132a–132d and other parts supported by the inner shaft 146 resulted in a diameter of about 1⅛ inches for the shaft 146, if made of steel. In addition, the needle bearings had a very smooth, case hardened surface to ride upon. The needle bearing selected had an outer diameter of about 1⅜ inches, so the outer shafts 148, 149 needed an inner diameter to match this specification. The hubs of the bevel gears 201(a & b) were bored to about 1¾ inches to allow the sleeve of the outer shafts 148, 149 to fit inside while leaving room for the screw holes required for mounting the shafts. It should be emphasized that the foregoing specifications are merely one specific example of numerous possible embodiments.

Figure 7A:
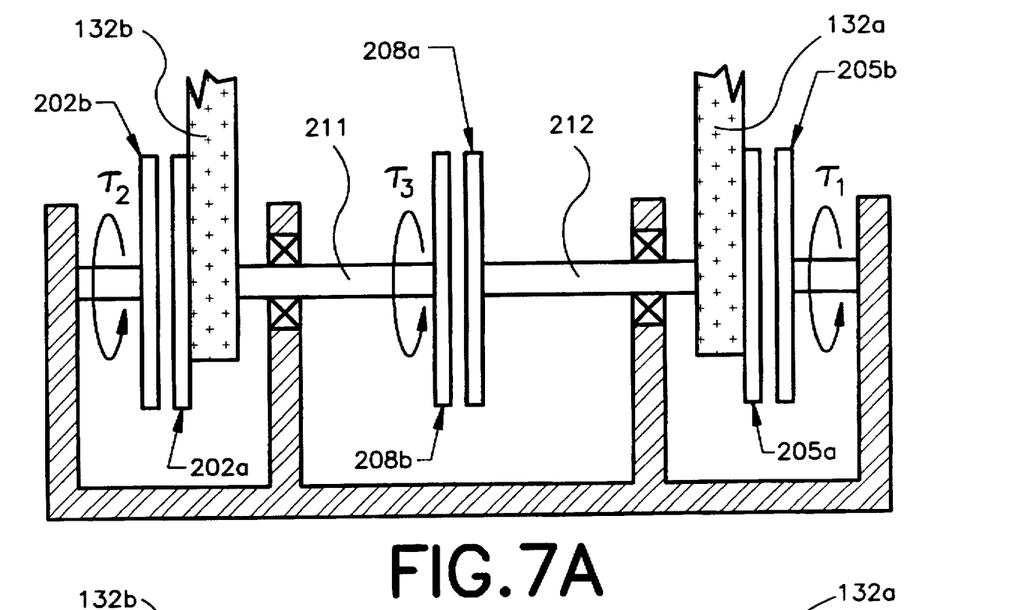
FIGS. 7A and 7B show schematic diagrams for illustrating the torques associated with the fifth embodiment of FIGS. 6A-6C.
Figure 7B:
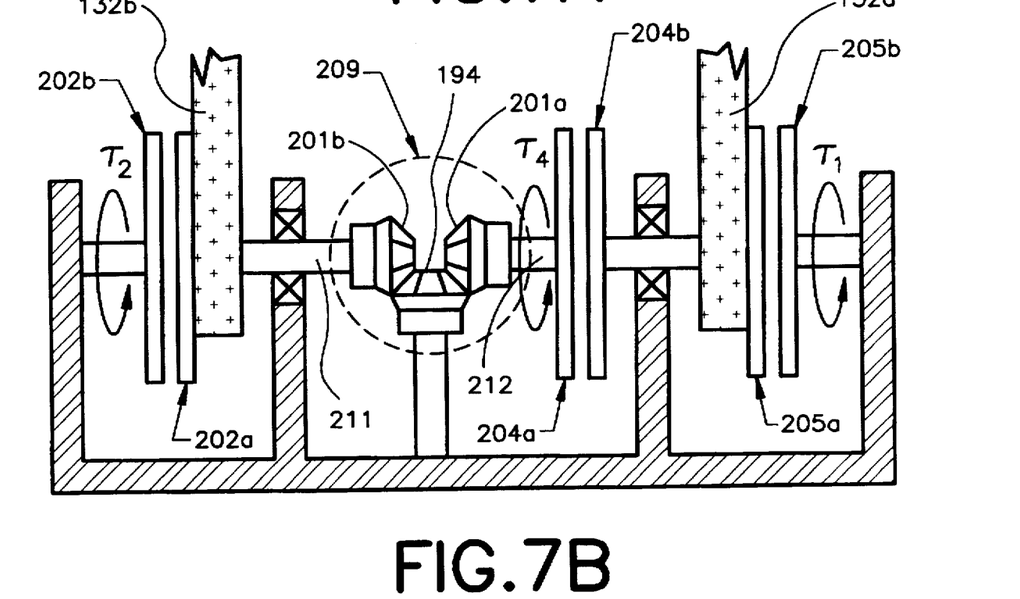

FIGS. 7A and 7B illustrate schematically the operation of the trajectory guidance apparatus 130 of FIGS. 6A–6C, and particularly, the concepts of direct coupling and indirect coupling between the arms 132a, 132b that essentially guide all motion of the linkage 35 and interaction part 12. Both of the arms 132a, 132b are individually braked. The brake mechanisms 202(a & b), 205(a & b) are depicted by torques $\tau_2$, $\tau_1$, respectively, to represent the torques that these brake

12 mechanisms 202(a & b), 205(a & b) apply on the joints. FIG. 7A shows brake 208(a & b) between two shafts 211, 212 that are both directly connected to their respective arms 132a, 132b. When activated, the brake 208(a & b) tends to constrain the two arms 132a, 132b to move in the same direction. FIG. 7B shows a similar configuration, except that one of the shafts 211, 212 passes through the bevel gear differential mechanism 209 (comprised of gears 194, 201). The differential mechanism 209 reverses the direction of the shafts 211, 212 so that when activated, the brake 204(a & b) tends to constrain the arms 132a, 132b to move in opposite directions. Thus, superimposing the two mechanisms of FIGS. 7A and 7B results in an apparatus 130 having the ability to brake each arm 132a, 132b individually, while allowing generally coupling between the arms 132a, 132b.

Sixth Embodiment

Figure 8:
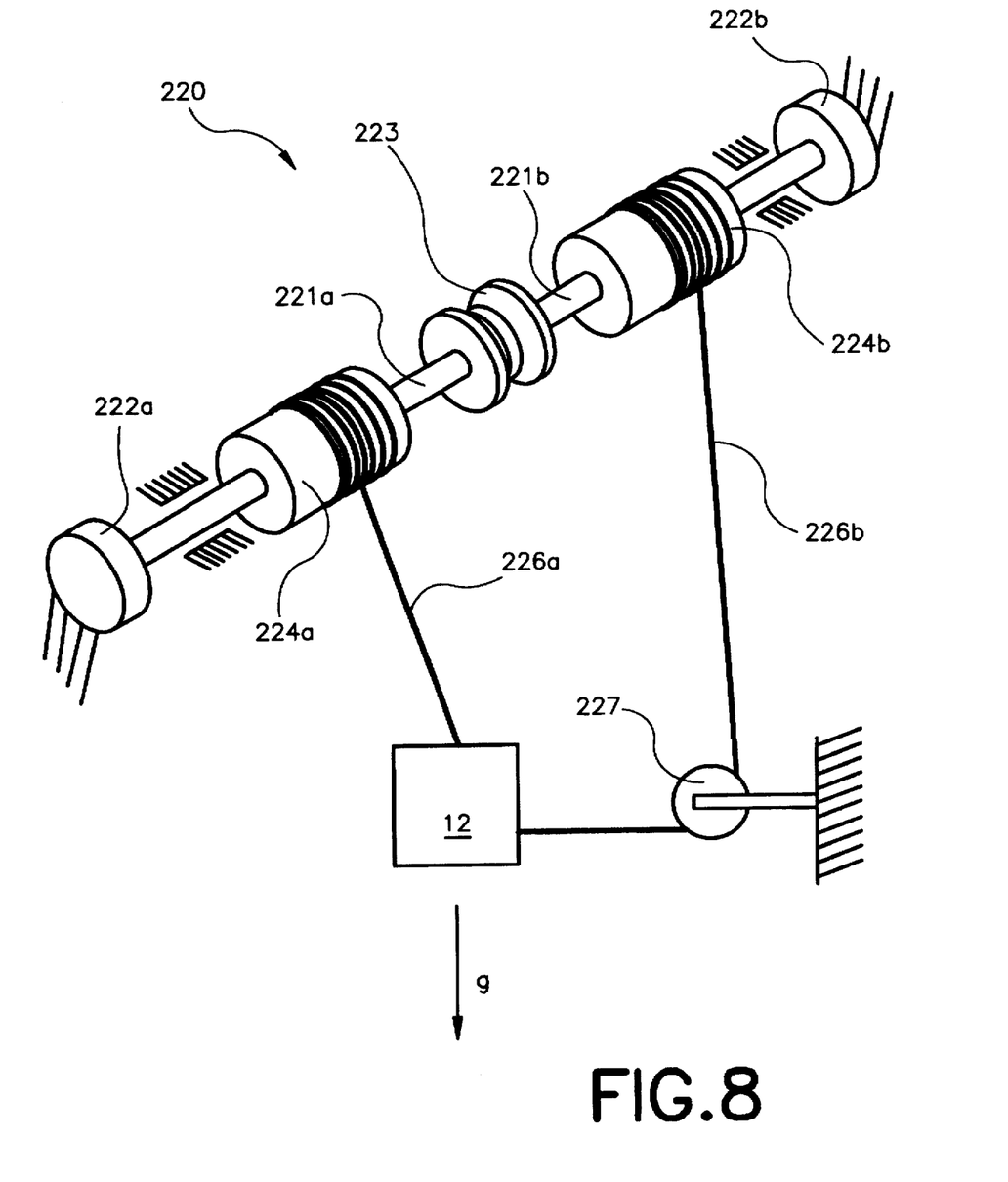
FIG. 8 shows a schematic diagram of a sixth embodiment of the novel trajectory guidance apparatus.

A sixth embodiment of the trajectory guidance apparatus is shown in FIG. 8 and is generally denoted by reference numeral 220. The trajectory guidance apparatus 220 generally comprises aligned rotatable first and second shafts 221a, 221b. The rotation of the shafts 221a, 221b can be independently and selectively regulated via respective brakes 222a, 222b secured to a reference (indicated by hash marks). The shafts 221a, 221b are selectively coupled together under the control of a conventional clutch 223. The clutch 223 can transfer energy between the shafts 221a, 221b. The brakes 222a, 222b and the clutch 223 together constitute a large part of the passive force coupling 22 (FIG. 2), and each is preferably electrically controlled via the control mechanism 34 (FIG. 2).

Each shaft 221a, 221b is equipped with respective cylindrical spool regions 224a, 224b that rotate with the corresponding shafts 221a, 221b. Respective cables flexible 226a, 226b (i.e., the force elements) are wrapped, or wound, around the periphery of the respective cylindrical spool regions 224a, 224b for regulating the lengths of respective cables 226a, 226b and ultimately the position and velocity of the interaction element 12. The cable 226a is attached directly to the interaction element 12 from the spool region 224a, and the cable 226b is indirectly connected to the interaction element 12 from the spool region 224b by way of a pulley 227 that can be rigidly affixed to the reference. In this embodiment, the interaction element 12 is forced downwardly by the earth's gravity g (force=m*g; g=about 9.8 m/s/s) and is guided directly by cables 226a, 226b and ultimately by brakes 222a, 222b and clutch 223.

It will be apparent to one with skill in the art that many variations and modifications can be made to the embodiments as described previously without substantially departing from the spirit and scope of the present invention. It is intended that all such variations and modifications be included herein within the scope of the present invention, as is set forth in the following claims.

Wherefore, the following is claimed:

1. A trajectory guidance apparatus capable of guiding motion with substantially passive elements with at least two degrees of freedom, comprising:

a plurality of force elements, each of said force element corresponding to a degree of freedom;

an interaction part connected to said force elements, said interaction part adapted to move said force elements and to be guided by said force elements, when an external force is applied to said interaction part;

a controllable passive coupling connected to said force elements, said controllable passive coupling adapted to impart respective passive forces against said force elements to guide movement of said force elements, said passive forces being derived substantially from said external force that is imparted to said interaction part; and a control means for controlling said controllable passive coupling so that said interaction part is guided along a prescribed path of travel by shifting energy from one of said force elements to another of said force elements.

2. The apparatus of claim 1, further comprising an interaction part position sensor adapted to sense a location of said interaction part, said interaction part position sensor configured to communicate a position signal to said control means, said control means configured to control said passive coupling along said prescribed path based upon said position signal.

3. The apparatus of claim 1, wherein said control means is adapted to control said controllable passive coupling so that said interaction part is guided along said prescribed path at a prescribed velocity by said force elements.

4. The apparatus of claim 1, wherein said control means dynamically controls said controllable passive coupling.

5. The apparatus of claim 1, wherein said passive coupling comprises a cylinder with an internal piston and a piston rod attached thereto associated with each said force element so that movement of said rod causes movement of said respective force element.

6. The apparatus of claim 1, wherein said passive coupling comprises a plurality of shafts, a differential mechanism interfacing at least two of said shafts, and a brake adapted to regulate rotation of one of said shafts.

7. The apparatus of claim 1, further comprising:

a rectangular table frame having an inner rail;

mobile linear bearings adapted to ride along said rail;

a first force element of said force elements having one of said bearings disposed at its distal ends; and a second force element of said force elements being prismatically mounted to said first force element and having one of said bearings at a distal end and one of said bearings near an end that supports said interaction part.

8. The apparatus of claim 1, further comprising:

a parallelogram structure comprised of said force elements that are interconnected at pivotal joints, said interaction part being mounted to said parallelogram structure, said parallelogram structure adapted to rotate about a reference and adapted to radially move said interaction part relative to said reference;

a first cylinder connecting a pair of opposing joints of said parallelogram structure and adapted to provide said radial movement based upon extension and retraction of a first piston shaft associated with said first cylinder; and a second cylinder connected between said parallelogram structure and said reference, said second cylinder adapted to provide said rotational movement based upon extension and retraction of a second piston shaft associated with said second cylinder.

9. The apparatus of claim 1, further comprising:

a parallelogram structure comprised of said force elements that are interconnected at pivotal joints, said interaction part being mounted to said parallelogram structure, said parallelogram structure adapted to rotate about a reference and adapted to radially move said interaction part relative to said reference;

a rotatable inner shaft;

rotatable first and second outer shafts;

a differential mechanism interfacing said first and second outer shafts;

a first brake adapted to couple said first force element to said inner shaft;

a second brake adapted to couple said first force element to a reference;

a third brake adapted to couple said second force element to said second outer shaft; and a fourth brake adapted to couple said second force element to a reference.

10. The apparatus of claim 1, (a) wherein said coupling comprises (i) rotatable first and second shafts, (ii) first and second brakes adapted to regulate rotation of said first and second shafts respectively; and (iii) a clutch interfacing said shafts; (b) wherein said force elements are first and second cables wound about said first and second shafts respectively; and (c) wherein said interaction part is connected to said cables.

11. The apparatus of claim 5, wherein each said cylinder is connected to another to permit exchange of fluid therebetween.

12. The apparatus of claim 7, wherein said passive coupling comprises a plurality of shafts, a differential mechanism interfacing at least two of said shafts, a brake adapted to regulate rotation of one of said shafts, and pulleys driven by said shafts and connected via belts to said bearings.

13. The apparatus of claim 7, wherein said passive coupling comprises a cylinder with an internal piston and a piston rod attached thereto associated with each said force element so that movement of said rod causes movement of said respective force element.

14. A trajectory guidance method for guiding motion with substantially passive elements with at least two degrees of freedom, comprising the steps of:

applying an external force to an interaction part of a linkage having at least two force elements and two degrees of freedom in order to move said interaction part;

forcing said force elements to move, as said interaction part moves, via energy derived substantially from an external force and via coupling of passive forces applied by said force elements; and guiding movement of said interaction part along a prescribed path via said force elements by controlling said passive forces imparted upon said interconnected force elements, by shifting energy from one of said force elements to another of said force elements.

15. The method of claim 14, further comprising the steps of:

sensing a location of said interaction part; and guiding said movement based upon said sensed location.

16. The method of claim 14, further comprising the step of guiding said interaction part along said prescribed path at a prescribed velocity with said force elements.

17. The method of claim 14, further comprising the step of utilizing a differential with first and second shafts to couple said passive elements, said first and second shafts being engaged with first and second force elements respectively that are connected to said interaction part.

18. The method of claim 14, further comprising the step of exchanging fluid between fluid cylinders associated with each of said force elements in order to couple said passive elements, each of said cylinders having an internal piston and a piston rod attached thereto associated with each said force element so that movement of said rod causes movement of said respective force element.

19. The method of claim 14, wherein said linkage comprises a parallelogram structure comprised of said force elements that are interconnected at pivotal joints, said interaction part being mounted to said parallelogram structure, said parallelogram structure adapted to rotate about a reference and adapted to radially move said interaction part relative to said reference.

20. A trajectory guidance method for guiding motion with passive elements with at least two degrees of freedom, comprising the steps of:

applying an external force to an interaction part of a linkage having at least two force elements and two degrees of freedom in order to move said interaction part;

forcing said force elements to move via energy derived solely from said external force and coupling of passive forces applied by said force elements to each other;

guiding movement of said interaction part along a prescribed path via said force elements by controlling said passive forces imparted upon said interconnected force elements; and utilizing a differential and a plurality of shafts to couple said passive elements, said plurality of shafts being engaged with said at least two force elements that are connected to said interaction part.

* * * * *